United States Patent
Park

(10) Patent No.: US 8,952,585 B2
(45) Date of Patent: Feb. 10, 2015

(54) ROTATING MEMBER FOR MOTOR AND BASE ASSEMBLY FOR MOTOR, AND MOTOR INCLUDING THE SAME

(75) Inventor: Dong Jin Park, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 191 days.

(21) Appl. No.: 13/609,567

(22) Filed: Sep. 11, 2012

(65) Prior Publication Data
US 2013/0076180 A1 Mar. 28, 2013

(30) Foreign Application Priority Data
Sep. 26, 2011 (KR) .................. 10-2011-0096744

(51) Int. Cl.
*H02K 5/16* (2006.01)
(52) U.S. Cl.
USPC ............................................. 310/90; 384/100
(58) Field of Classification Search
USPC ........................................... 310/90; 384/100
See application file for complete search history.

(56) References Cited

U.S. PATENT DOCUMENTS

| 2003/0197438 | A1 | 10/2003 | Oku | |
|---|---|---|---|---|
| 2009/0196540 | A1* | 8/2009 | Maruyama et al. | 384/100 |
| 2010/0315742 | A1 | 12/2010 | Kimura et al. | |
| 2012/0319515 | A1* | 12/2012 | Shin | 310/90 |
| 2013/0033137 | A1* | 2/2013 | Yu | 310/90 |

FOREIGN PATENT DOCUMENTS

| JP | 2003-314535 | 11/2003 |
|---|---|---|
| JP | 2010-286071 | 12/2010 |

OTHER PUBLICATIONS

Korean Office Action issued Jul. 14, 2014 in corresponding Korean Patent Application No. 10-2011-0096744.

* cited by examiner

*Primary Examiner* — Hanh Nguyen

(57) ABSTRACT

There is provided a rotating member for a motor, the rotating member including: a hub coupled to a shaft system of the motor and rotating together therewith; a main wall portion protruding from one surface of the hub and allowing oil to be sealed between the main wall portion and a sleeve supporting the shaft system; and a pumping portion formed in a lower surface of the main wall portion and generating fluid pressure for preventing a leakage of the oil.

11 Claims, 6 Drawing Sheets

ROTATING MEMBER FOR MOTOR AND
BASE ASSEMBLY FOR MOTOR, AND MOTOR
INCLUDING THE SAME

CROSS-REFERENCE TO RELATED
APPLICATIONS

This application claims the priority of Korean Patent Application No. 10-2011-0096744 filed on Sep. 26, 2011, in the Korean Intellectual Property Office, the disclosure of which is incorporated herein by reference.

BACKGROUND OF THE INVENTION

1. Field of the Invention

The present invention relates to a rotating member for a motor and a base assembly for a motor, and a motor including the same.

2. Description of the Related Art

A hard disk drive (HDD), an information storage device, reads data stored on a disk or writes data to a disk using a read/write head.

The hard disk drive requires a disk driving device capable of driving the disk. In the disk driving device, a small-sized motor is used.

In the small-sized motor, a hydrodynamic bearing has been used. A shaft, a rotating member of the hydrodynamic bearing, and a sleeve, a fixed member thereof, include oil interposed therebetween, such that the shaft is supported by fluid pressure generated in the oil.

A fluid-air interface between the oil generating the fluid dynamic pressure and surrounding air should be formed between a hub, a rotating member of the hydrodynamic bearing, and a sleeve, a fixed member thereof, in order to prevent oil from being leaked to the outside.

However, in the motor according to the related art, a problem in which the rotating member is affected by an oversupply of oil, an external impact, or the like, at the time of rotation thereof, such that the oil is leaked, has occurred.

In the case in which oil is leaked, a surface of a disk having information stored thereon may be polluted, such that a loss of data may occur, and a hydrodynamic bearing may not operate stably. Therefore, research into a technology for preventing a leakage of oil has been urgently demanded.

SUMMARY OF THE INVENTION

An aspect of the present invention provides a rotating member for a motor and a base assembly for a motor that are capable of significantly increasing a performance and a lifespan of a motor by preventing a phenomenon in which oil is leaked from a fluid-air interface of oil and external air formed between a hub and a sleeve, and a motor including the same.

According to an aspect of the present invention, there is provided a rotating member for a motor, the rotating member including: a hub coupled to a shaft system of the motor and rotating together therewith; a main wall portion protruding from one surface of the hub and allowing oil to be sealed between the main wall portion and a sleeve supporting the shaft system; and a pumping portion formed in a lower surface of the main wall portion and generating fluid pressure for preventing a leakage of the oil.

The pumping portion may generate fluid pressure in an inner diameter direction in the case in which the hub rotates.

The pumping portion may be formed as a groove having a spiral shape or a helix shape.

The main wall portion may be formed to surround an outer peripheral surface of the sleeve so that a fluid-air interface between the oil and surrounding air is formed between the main wall portion and an outer peripheral surface of an upper portion of the sleeve.

The lower surface of the main wall portion may face a base to which the sleeve is fixed.

According to another aspect of the present invention, there is provided a base assembly for a motor, the base assembly including: a sleeve supporting a shaft system of the motor rotating together with a hub and allowing oil to be sealed between the sleeve and a main wall portion protruding from one surface of the hub; a base having the sleeve fixed thereto; and a pumping portion formed in an upper surface of the base and generating fluid pressure for preventing a leakage of the oil.

The pumping portion may generate fluid pressure in an inner diameter direction in the case in which the hub rotates.

The pumping portion may be formed as a groove having a spiral shape or a helix shape.

An outer peripheral surface of the sleeve facing the main wall portion may be tapered so as to have a diameter reduced downwardly in an axial direction.

The upper surface of the base may face a lower surface of the main wall portion protruding from one surface of the hub.

According to another aspect of the present invention, there is provided a motor including: a hub coupled to a shaft system of the motor and rotating together therewith; a sleeve supporting the shaft system; a base having the sleeve fixed thereto; a main wall portion protruding from one surface of the hub and allowing oil to be sealed between the main wall portion and the sleeve; and a pumping portion formed in at least one of a lower surface of the main wall portion and the base facing the lower surface of the main wall portion and generating fluid pressure for preventing a leakage of the oil.

BRIEF DESCRIPTION OF THE DRAWINGS

The above and other aspects, features and other advantages of the present invention will be more clearly understood from the following detailed description taken in conjunction with the accompanying drawings, in which.

Figure 1:
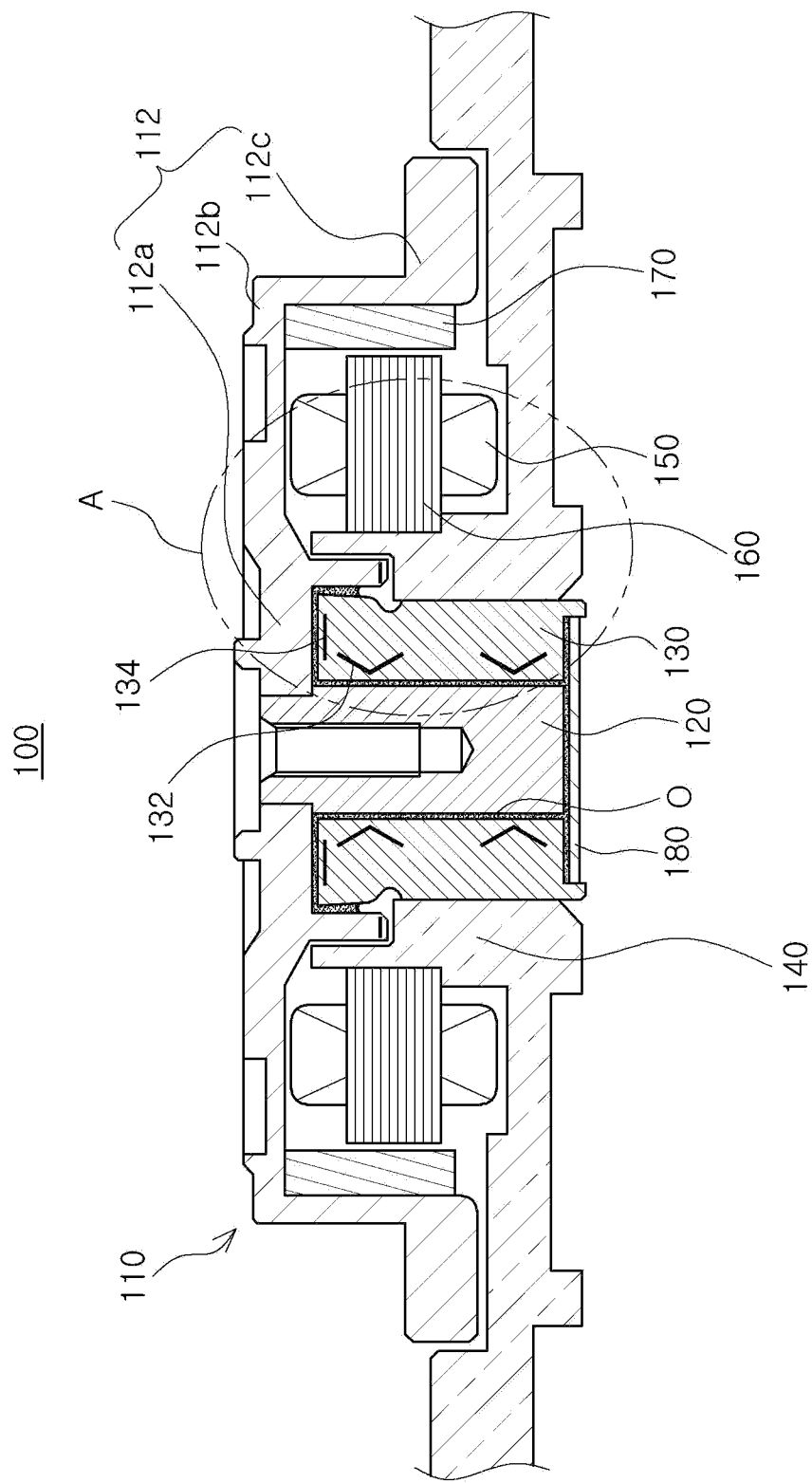
FIG. 1 is a schematic cross-sectional view showing a motor including a rotating member for a motor and a base assembly for a motor according to an embodiment of the present invention.

DETAILED DESCRIPTION OF THE
EMBODIMENTS

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

Figure 2:
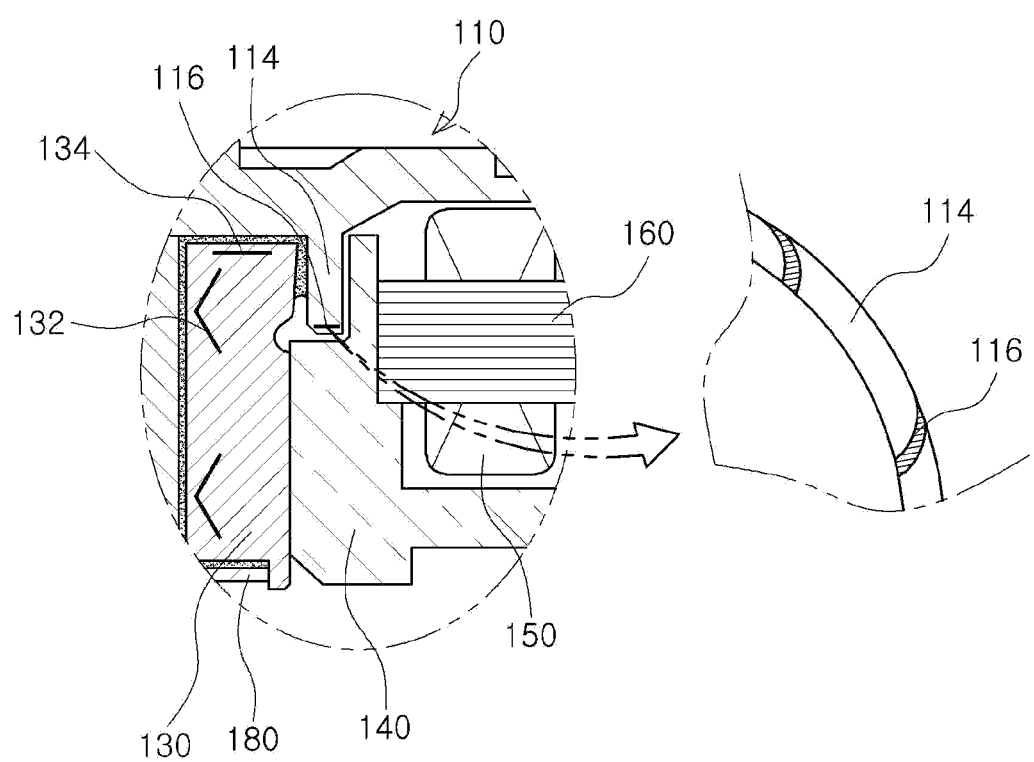
FIG. 2 is a partially enlarged cross-sectional view showing section A of FIG. 1 and a lower surface of a main wall portion.

FIG. 1 is a schematic cross-sectional view showing a motor including a rotating member for a motor and a base assembly for a motor according to an embodiment of the present invention; and FIG. 2 is a partially enlarged cross-sectional view showing section A of FIG. 1 and a lower surface of a main wall portion.

Referring to FIGS. 1 and 2, the motor 100 according to the embodiment of the present invention may include a rotating member 110 for a motor (hereinafter, referred to as a rotating member) and a base assembly 140 for a motor (hereinafter, referred to as a base assembly).

The rotating member 110 may include a hub 112 rotating together with a shaft system 120 of the motor, a main wall portion 114 protruding from one surface of the hub 112, and a pumping portion 116 formed in a lower surface of the main wall portion 114, and the base assembly may include a sleeve 130 supporting the shaft system 120 of the motor and a base 140 having the sleeve 130 fixed thereto.

Terms with respect to directions will first be defined. As viewed in FIG. 1, an axial direction refers to a vertical direction based on the shaft system 120, and an outer diameter or inner diameter direction refers to a direction towards an outer edge of the hub 112 based on the shaft system 120 or a direction towards the center of the shaft system 120 based on the outer edge of the hub 112.

The rotating member 110 may include the hub 112, the main wall portion 114, and the pumping portion 116. Here, the hub 112, the rotating member 110 coupled to the shaft system 120 of the motor and rotating together with the shaft system 120, may be a rotating structure rotatably provided with respect to the base 140.

In addition, the hub 112 may be connected to a disk mounting part 112c by a coupling portion 112a fixing an upper end of the shaft system 120 of the motor and an extension portion 112b extended from an end portion of the coupling portion 112a in the outer diameter direction and then extended again in a downward axial direction to thereby be formed integrally with the disk mounting portion 112c.

Here, the extension portion 112b may include a magnet 170 coupled to an inner peripheral surface thereof, wherein the magnet 170 is a permanent magnet generating magnetic force having a predetermined strength by alternately magnetizing an N pole and an S pole in a circumferential direction and electromagnetically interacts with a coil 150 to be described below to rotate the hub 112.

In addition, the hub 112 may allow oil O to be sealed between the hub 112 and an outer peripheral surface of an upper portion of the sleeve 130 and include the main wall portion 114 extended in the downward axial direction so that the oil O is sealed.

That is, the main wall portion 114 may protrude from one surface of the hub 112, the rotating member, to allow the oil O to be sealed between the main wall portion 114 and the sleeve 130, a fixed member, and be extended to surround the outer peripheral surface of the sleeve 130 so that a fluid-air interface between the oil and surrounding air is formed between the main wall portion 114 and the outer peripheral surface of the upper portion of the sleeve 130.

Further, the low surface of the main wall portion 114 may face the base 140 to which the sleeve 130 is fixed.

Here, the main wall portion 114 may include the pumping portion 116 formed in the lower surface thereof, wherein the pumping portion 116 generates fluid pressure for preventing a leakage of the oil O.

However, the pumping portion 116 is not limited to being formed in the lower surface of the main wall portion 114, but may also be formed in at least one of the lower surface of the main wall portion 114 and an upper surface of the base 140 facing the lower surface of the main wall portion 114.

The sleeve 130 may a fixed member supporting the shaft system 120 so that an upper end of the shaft system 120 of the motor that rotates protrudes in an upward axial direction and may be formed by forging Cu or Al or sintering Cu—Fe based alloy powders or SUS based powders.

Here, the shaft system 120 may be inserted into a shaft hole of the sleeve 130 so as to have a micro clearance between the shaft system 120 and the shaft hole of the sleeve 130, wherein the micro clearance is filled with the oil. In addition, a radial dynamic pressure portion 132 may be formed in at least one of an outer peripheral surface of the shaft system 120 and an inner peripheral surface of the sleeve 130.

Rotation of the rotating member 110 including the hub 112 may be smoothly supported by radial dynamic pressure generated by the radial dynamic pressure portion 132.

Here, the radial dynamic pressure portion 132 may have any one of a herringbone shape, a spiral shape, and a helix shape.

In addition, the sleeve 130 may include a thrust dynamic pressure portion 134 formed in an upper surface thereof so as to generate thrust dynamic pressure through the oil O. The rotating member 110 including the shaft system 120 of the motor may rotate in a state in which a predetermined floating force is secured by the thrust dynamic pressure portion 134.

Here, the thrust dynamic pressure portion 134 may be a groove having a herringbone shape, a spiral shape, or a helix shape, similar to the radial dynamic pressure portion 132. However, the thrust dynamic pressure portion 134 is not necessarily limited to having the above-mentioned shape, but may have any shape as long as the thrust dynamic pressure may be provided.

In addition, the thrust dynamic pressure portion 134 is not limited to being formed in the upper surface of the sleeve 130, but may also be formed in one surface of the hub 112 corresponding to the upper surface of the sleeve 130.

The outer peripheral surface of the sleeve 130 facing the main wall portion 114 may be tapered so as to have a diameter reduced downwardly in the downward axial direction. Therefore, an area at which the oil filled between the main wall portion 114 and the outer peripheral surface of the sleeve 130 contacts the air is increased, such that surface tension may be increased and the fluid-air interface between the oil O and surrounding air may be maintained.

The sleeve 130 may include a base cover 180 coupled thereto at a lower portion thereof so as to close the lower portion thereof, and the oil O may be continuously filled in a clearance between the shaft system 120 and the sleeve 130, a clearance between the hub 112 and the sleeve 130, and a clearance between the base cover 180, and the shaft system 120 and the sleeve 130, to form an entire full-fill structure.

The base 140 may be a fixed member supporting the rotation of the rotating member 110 including the hub 112.

Here, the base 140 may include a core 160 coupled thereto, wherein the core 160 has the coil 150 wound therearound. The core 160 may be fixedly disposed on the base 140 including a printed circuit board (not shown) having pattern circuits printed thereon.

In other words, the outer peripheral surface of the sleeve 130 and the core 160 having the coil 150 wound therearound may be inserted into the base 140, such that the sleeve 130 and the core 160 are coupled to the base 140.

Here, as a method of coupling the sleeve 130 and the core 160 to the base 140, a bonding method, a welding method, a press-fitting method, or the like, may be used. However, the method of coupling the sleeve 130 and the core 160 to the base 140 is not necessarily limited thereto.

Figure 3:
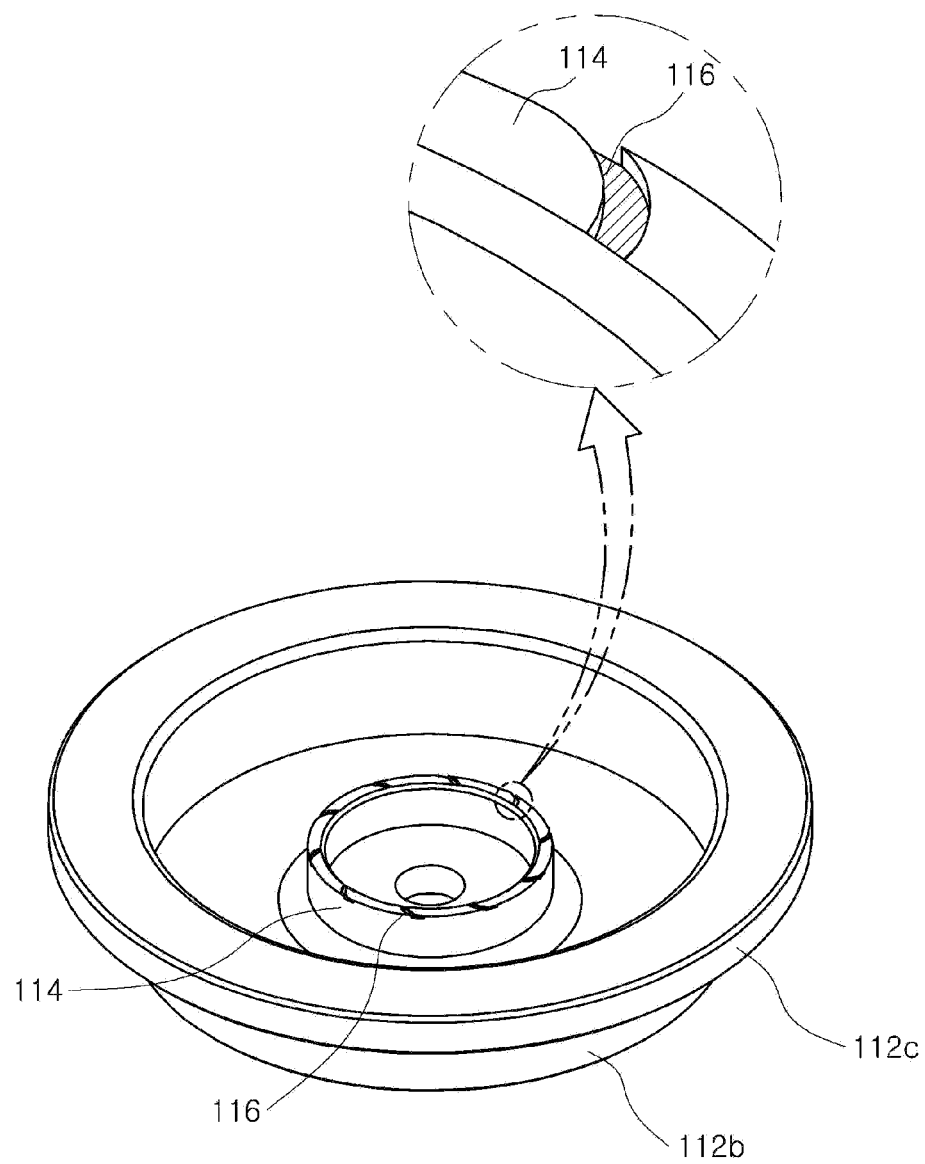
FIG. 3 is a perspective view of the rotating member for a motor according to the embodiment of the present invention.

FIG. 3 is a perspective view of the rotating member for a motor according to the embodiment of the present invention.

Referring to FIG. 3, the pumping portion 116 may be formed as a groove having a spiral shape as shown in FIG. 3 and prevent a phenomenon in which the oil O is leaked from the fluid-air interface between the oil and surrounding air formed between the hub 112 and the sleeve 130.

More specifically, the pumping portion 116 may generate fluid pressure in the inner diameter direction, due to the presence of air, at the time of the rotation of the rotating member 110 including the hub 112.

Therefore, the leakage of oil from the fluid-air interface between the oil and surrounding air formed between the hub 112 and the sleeve 130 may be prevented in advance.

In addition, even in a case in which the oil O contacts the pumping portion 116 due to an influence of an impact, or the like, the fluid pressure is generated in the inner diameter direction due to the presence of air, whereby the phenomenon in which the oil O is leaked may be prevented.

However, although the pumping portion 116 having the spiral shape is shown in FIG. 3, the pumping portion 116 is not limited to having the spiral shape, but may have any shape such as a helix shape, or the like, as long as the fluid pressure may be generated in the inner diameter direction.

Figure 4:
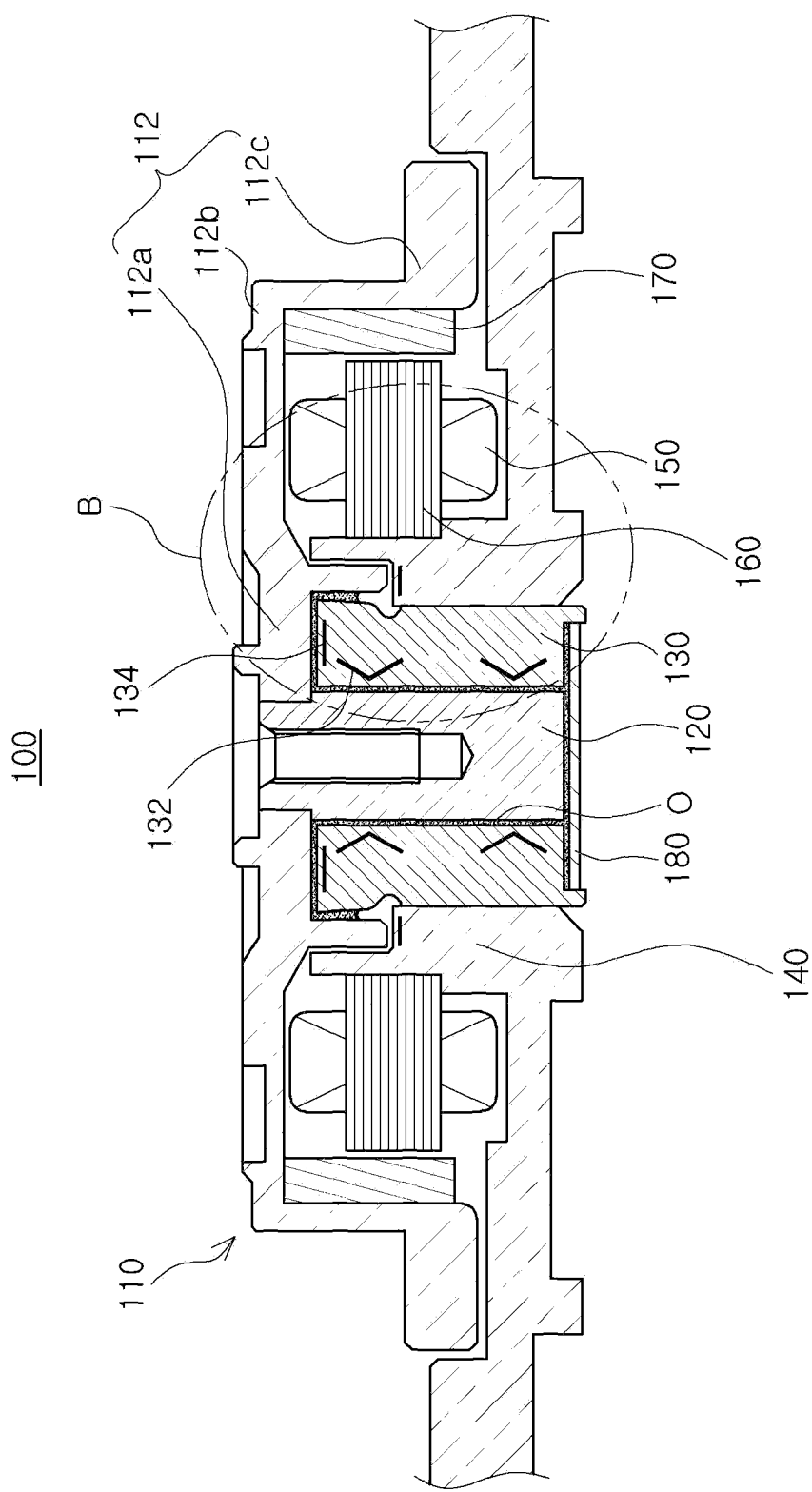
FIG. 4 is a schematic cross-sectional view showing a motor including a rotating member for a motor and a base assembly for a motor according to another embodiment of the present invention.
Figure 5:
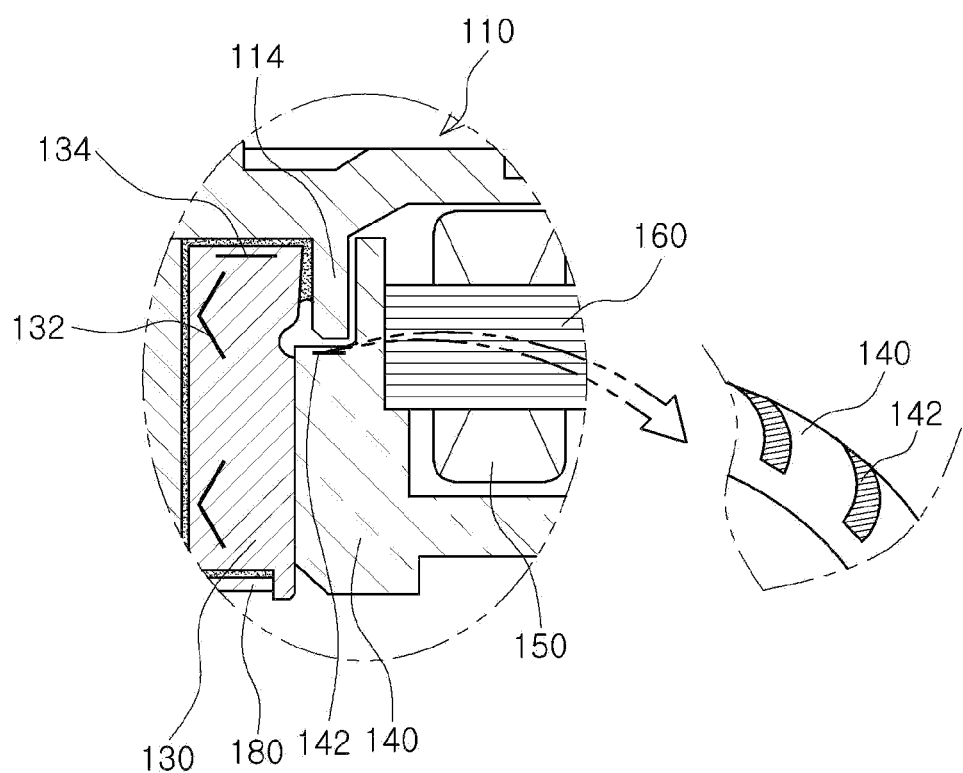
FIG. 5 is a partially enlarged cross-sectional view showing section B of FIG. 4 and an upper surface of a base.

FIG. 4 is a schematic cross-sectional view showing a motor including a rotating member for a motor and a base assembly for a motor according to another embodiment of the present invention; FIG. 5 is a partially enlarged cross-sectional view showing section B of FIG. 4 and an upper surface of a base; and FIG. 6 is a perspective view of the base assembly for a motor according to another embodiment of the present invention.

Figure 6:
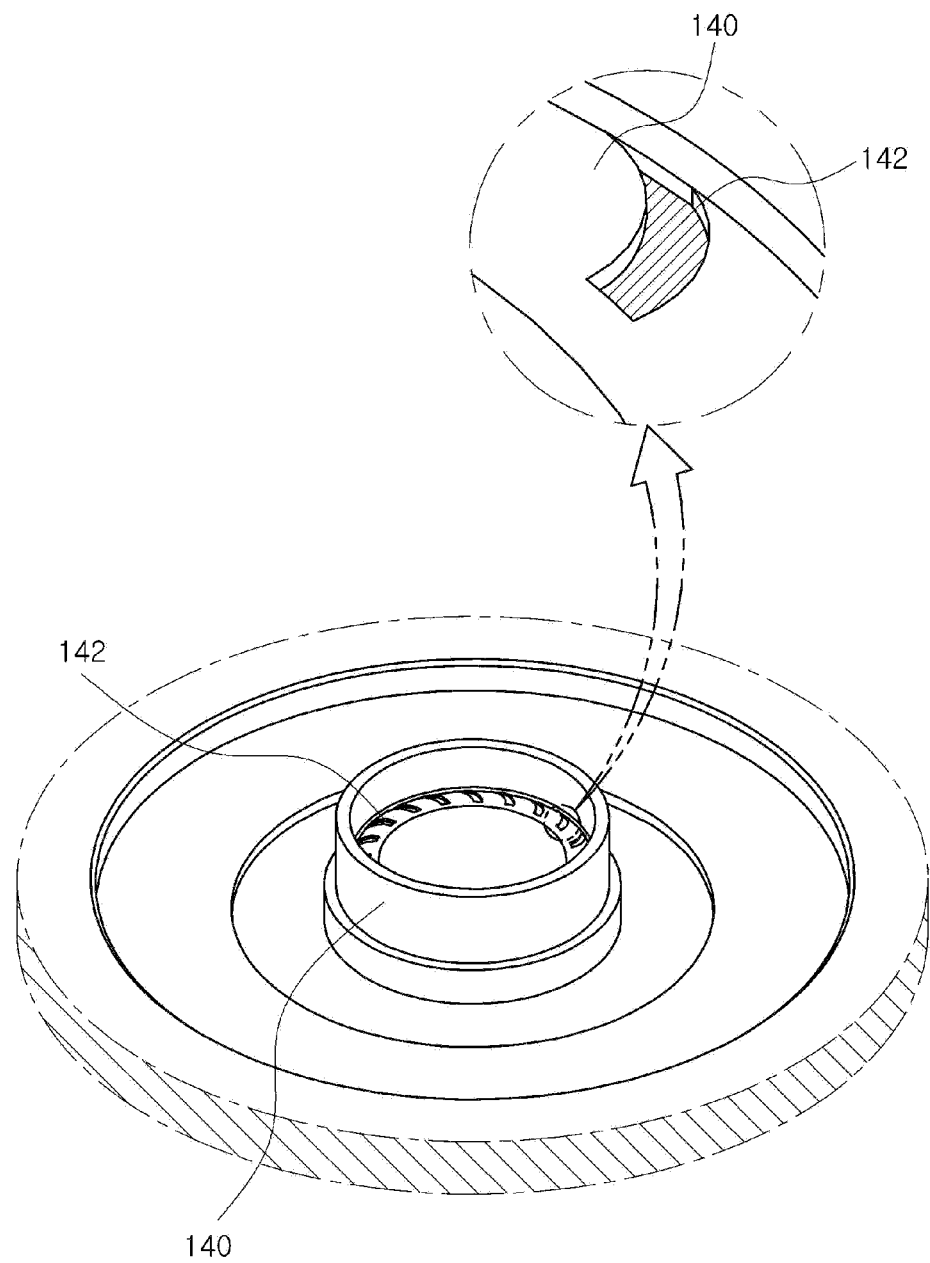
FIG. 6 is a perspective view of the base assembly for a motor according to another embodiment of the present invention.

Referring to FIGS. 4 through 6, the base 140 may include a pumping portion 142 formed in an upper surface thereof facing a lower surface of the main wall portion 114.

The pumping portion 142 may be formed as a groove having a spiral shape as shown in FIG. 5 and prevent a phenomenon in which the oil O is leaked from the fluid-air interface between the oil and surrounding air formed between the hub 112 and the sleeve 130.

More specifically, the pumping portion 142 may generate fluid pressure in the inner diameter direction, due to the presence of air, at the time of the rotation of the rotating member 110 including the hub 112.

Therefore, the leakage of the oil O from the fluid-air interface between the oil and surrounding air formed between the hub 112 and the sleeve 130 may be prevented in advance.

In addition, even in a case in which the oil O contacts the pumping portion 142 due to an influence of an impact, or the like, the fluid pressure is generated in the inner diameter direction, due to the presence of air, whereby the phenomenon in which the oil is leaked may be prevented.

However, although the pumping portion 142 having the spiral shape is shown in FIGS. 5 and 6, the pumping portion 142 is not limited to having the spiral shape, but may have any shape such as a helix shape, or the like, as long as the fluid pressure may be generated in the inner diameter direction.

According to the embodiments of the present invention described above, the leakage of the oil O is prevented by the pumping portion 116 or 142 formed in at least one of the lower surface of the main wall portion 114 protruding from one surface of the hub 112 and the upper surface of the base facing the lower surface of the main wall portion 114, whereby the motor 100 having the improved performance and lifespan may be implemented.

However, the shape of the pumping portion 116 or 142 is not limited to the shape shown in the accompanying drawings, but may be changed by those skilled in the art to which the present invention pertains.

As set forth above, with the rotating member for a motor and the base assembly for a motor, and the motor including the same, the groove is formed in at least one of the hub, a rotating member, and the base facing the hub to generate fluid pressure in the inner diameter direction, such that the leakage of the oil is prevented, whereby the performance and the lifespan of the motor may be significantly increased.

While the present invention has been shown and described in connection with the embodiments, it will be apparent to those skilled in the art that modifications and variations can be made without departing from the spirit and scope of the invention as defined by the appended claims.

What is claimed is:

1. A rotating member for a motor, the rotating member comprising:
    a hub coupled to a shaft system of the motor and rotating together therewith;
    a main wall portion protruding from one surface of the hub and allowing oil to be sealed between the main wall portion and a sleeve supporting the shaft system; and
    a pumping portion formed in a lower surface of the main wall portion and generating fluid pressure for preventing a leakage of the oil.

2. The rotating member of claim 1, wherein the pumping portion generates the fluid pressure in an inner diameter direction in the case in which the hub rotates.

3. The rotating member of claim 1, wherein the pumping portion is formed as a groove having a spiral shape or a helix shape.

4. The rotating member of claim 1, wherein the main wall portion is formed to surround an outer peripheral surface of the sleeve so that a fluid-air interface between the oil and surrounding air is formed between the main wall portion and an outer peripheral surface of an upper portion of the sleeve.

5. The rotating member of claim 1, wherein the lower surface of the main wall portion faces a base to which the sleeve is fixed.

6. A base assembly for a motor, the base assembly comprising:
    a sleeve supporting a shaft system of the motor rotating together with a hub and allowing oil to be sealed between the sleeve and a main wall portion protruding from one surface of the hub;
    a base having the sleeve fixed thereto; and
    a pumping portion formed in an upper surface of the base and generating fluid pressure for preventing a leakage of the oil.

7. The base assembly of claim 6, wherein the pumping portion generates the fluid pressure in an inner diameter direction in the case in which the hub rotates.

8. The base assembly of claim 6, wherein the pumping portion is formed as a groove having a spiral shape or a helix shape.

9. The base assembly of claim 6, wherein an outer peripheral surface of the sleeve facing the main wall portion is tapered so as to have a diameter reduced downwardly in an axial direction.

10. The base assembly of claim 6, wherein the upper surface of the base faces a lower surface of the main wall portion protruding from one surface of the hub.

11. A motor comprising:
- a hub coupled to a shaft system of the motor and rotating together therewith;
- a sleeve supporting the shaft system;
- a base having the sleeve fixed thereto;
- a main wall portion protruding from one surface of the hub and allowing oil to be sealed between the main wall portion and the sleeve; and
- a pumping portion formed in at least one of a lower surface of the main wall portion and the base facing the lower surface of the main wall portion and generating fluid pressure for preventing a leakage of the oil.

* * * * *